Jan. 17, 1967  L. T. STOYKE ETAL  3,298,174
CONTROL SYSTEM FOR INFINITELY VARIABLE AUTOMATIC TRANSMISSION
Filed June 11, 1965  4 Sheets-Sheet 1

INVENTORS
LUDWIG T. STOYKE
KENNETH W. PORTER
BY
*Darby & Darby*
ATTORNEYS

United States Patent Office 3,298,174
Patented Jan. 17, 1967

3,298,174
CONTROL SYSTEM FOR INFINITELY VARIABLE AUTOMATIC TRANSMISSION
Ludwig T. Stoyke, West Islip, N.Y., and Kenneth W. Porter, Mercer Island, Wash., assignors to Fairchild Hiller Corporation, Hagerstown, Md., a corporation of Maryland
Filed June 11, 1965, Ser. No. 463,073
20 Claims. (Cl. 60—19)

The present invention relates to control systems for infinitely variable transmissions and more particularly to control systems for infinitely variable transmissions of the hydrostatic type which are effective to automatically shift the transmission to the particular ratio most suitable to the instantaneous operating condition of the vehicle with which the transmission is used.

It is an object of the present invention to provide a control system for use with a transmission of the combined hydrostatic-mechanical type.

Another object is to provide a control system for use with a transmission in which the transmission has a mechanical neutral lock.

An additional object is to provide a transmission control system having a linearized speed governor and amplifier.

A further object is to provide a transmission control system with an overpressure relief valve circuit.

Still another object is to provide a control system for a transmission of the combined hydrostatic-mechanical type capable of operating the transmission in a variety of modes smoothly and efficiently.

Other objects and advantages of the present invention will become more apparent upon reference to the following specification and annexed drawings in which.

GENERAL

Figure 1:
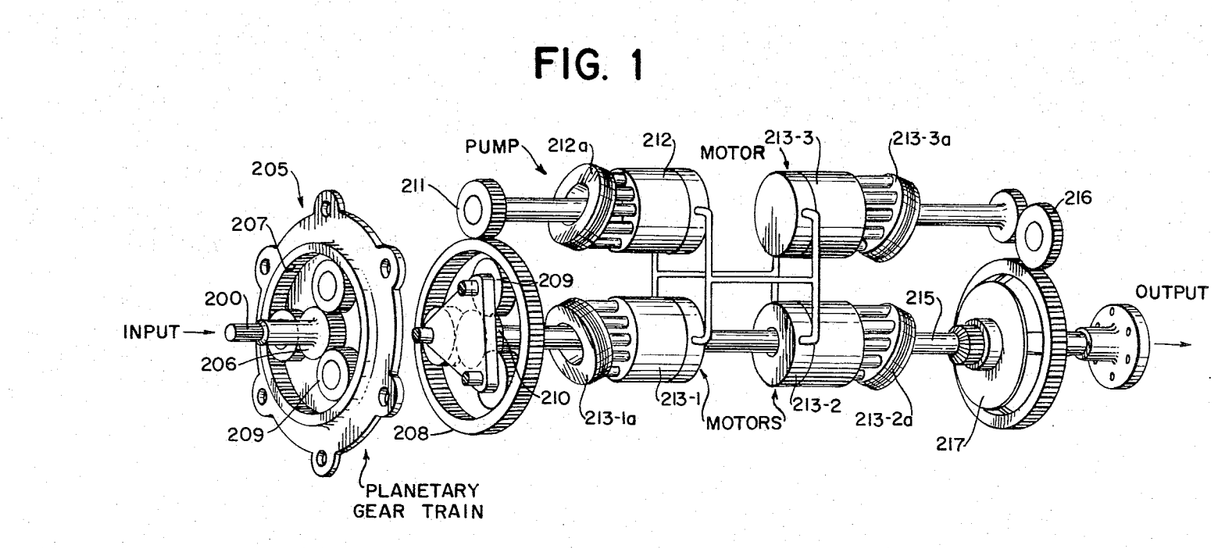
FIGURE 1 is a perspective, partially diagrammatic view of the mechanical-hydraulic components of one type of transmission with which the control system of the present invention can be used.

FIGURE 1 illustrates the general principles of the type of transmission with which the control system of the present invention is to be used, although it can be used with other types. The transmission of FIGURE 1 is of split torque type in which part of the input torque is transmitted mechanically through gears. Torque multiplication is achieved by means of a variable displacement hydrostatic circuit. Automatic control of the variable displacement hydrostatic elements is matched to the engine power level, and vehicle load, by the control system of the invention so that the engine operates at the speed for best fuel consumption for the power required.

The mechanical input from the prime mover is applied to a shaft 200. Shaft 200 is connected to a dividing or ratio planetary gear set comprising an input sun gear 206, a fixed input ring gear 207, a rotatable output ring gear 208 with the same number of internal teeth as the fixed gear 207, a set of planet gears 209 (all with the same number of teeth), mounted on a freely rotating carrier, and an output sun gear 210 with the same number of teeth as the input sun gear 206. If the rotatable ring gear 208 is held stationary, the output sun gear 210 rotates at the same speed as the input sun gear. This is the condition that occurs at 1:1 ratio of the transmission.

Output ring gear 208 also bears external teeth which mesh with a pinion 211 that drives a hydraulic pump 212. Pump 212 is restrained from rotating at 1:1 ratio. When the output ring gear 208 is permitted to rotate, driving the pump, the speed of the output sun gear is reduced. However, the mechanical advantage of the gears is unchanged and the output sun gear always transmits the same torque as the engine applies to the input sun gear.

Pump 212 supplies fluid (pressure) to each of three motors 213–1, 213–2 and 213–3 having the same displacement as the pump. Consequently, each motor delivers the same torque as is supplied to drive the pump.

In FIGURE 1, motors 213–1 and 213–2 are splined to an output shaft 215 and rotate always at the speed of the output sun gear 210. The third motor 213–3 is connected by a three to one reduction gear 216 through a clutch 217 to the output shaft. The torque applied to the input sun gear is transmitted through the ratio planetary and the output sun gear to the output shaft. In 1:1 ratio, the third motor 213–3 clutch 217 is disengaged, its swashplate 213–3a is at zero angle, and motor 213–3 is stationary. The first and second motors 213–1 and 213–2 rotate with the output shaft but, since their swashplates are at zero angle, their displacement is zero and they accept no oil from the pump. Since the pump swashplate 212a is at its maximum angle, the pump builds hydraulic pressure but, with no place for the oil to flow, the pump is restrained from rotating and its driving pinion holds the rotatable ring gear stationary.

The transmission is down-shifted by pivoting the first and second motor swashplates 213–1a and 213–2a simultaneously, the pump remaining at full displacement. When the two motors reach their full displacement, they each deliver a torque unit to the output shaft that is equal to the pump input torque. These two torque units are added to the mechanical torque delivered through the ratio planetary. The total output torque is then three times the input torque at one-third the input speed.

At this point, the third motor 213–3 displacement is still zero and the clutch 217 is engaged under no load. The third motor swashplate 213–3a is then pivoted toward its maximum angle adding torque to the output shaft through the reduction gear 216. At full displacement of the third motor, its torque unit is multiplied three times by the reduction gear so that three torque units are added to the output shaft. This gives one mechanical torque unit, two hydraulic torque units from the first and second motors 213–1 and 213–2 and three hydraulic torque units from the third motor 213–3, a total of six torque units. The overall transmission ratio is now 6:1 at one-sixth the input speed.

Further torque multiplication is achieved by reducing the pump swashplate 212a angle to reduce its displacement. At reduced pump displacement, the motor to pump torque ratio increases which increases the torque delivered by the three motors.

Overdrive and reverse are explained in the following manner. Returning to the 1:1 ratio condition, the pump is at its maximum displacement and the motors are all at zero displacement with the third motor clutch 217 disengaged. Now, if the swashplates 213–1a and 213–2a of the first and second motors are tilted past zero to a small negative angle, the output shaft will drive these two hydrostatic elements as pumps, reversing the pressure in the hydraulic system. The pump 213 then becomes a motor and drives the rotatable ring gear 208 in the opposite direction to the input sun gear 206 causing the output sun gear and the output shaft to rotate faster than the input shaft. The torque required to drive the hydrostatic elements mounted on the output shaft is subtracted from the torque unit transmitted through the output sun gear.

Reverse operation is obtained by tilting the pump swashplate 213a to a fixed negative angle while the three motors 213 are in their maximum displacement condition and the third motor clutch 217 is engaged. This reverses the pressure in the hydraulic circuit causing the motors to run in reverse rotation. At the equivalent pump angle of forward drive the torque multiplication achieved in reverse is less than the torque in forward drive, usually about 8:1. In reverse drive position, the mechanical torque unit transmitted through the output sun gear is subtracted from the hydraulic torque rather than added to it.

For a more complete description of power units of the split mechanical-hydrostatic type, reference is made to United States Patents 3,074,296 and 3,123,975 to Heinrich Ebert.

Control of the hydromechanical transmission is achieved by a hydraulic system which is responsive to engine speed, output shaft load, engine power control (accelerator pedal or throttle) and drive mode selector. It is toward the control of the hydraulic system that the present invention is directed. While the invention is described with respect to a transmission operation on a 10:1 forward ratio, 0.8:1 overdrive ratio and 8:1 reverse ratio, other suitable ratios may be used.

Before describing the operation of the complete control system, a description is given for certain of the major components thereof together with their respective functions.

PUMP AND MOTOR

Figure 2:
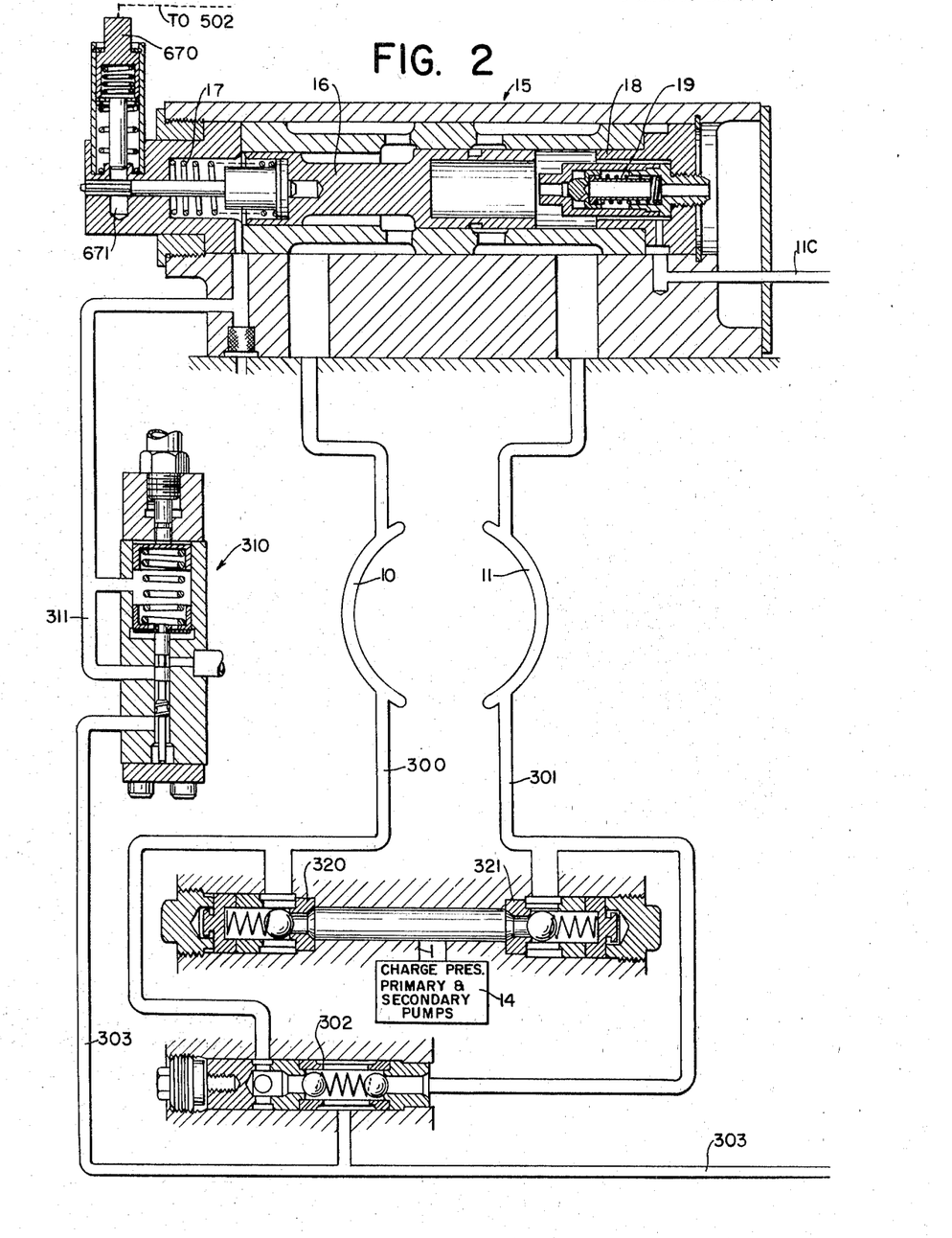
FIGURES 2, 3 and 4, when arranged in the manner shown in FIGURE 6, is a representation of the control system, partially in schematic form and partially in cross-section, of the present invention.
Figure 3:
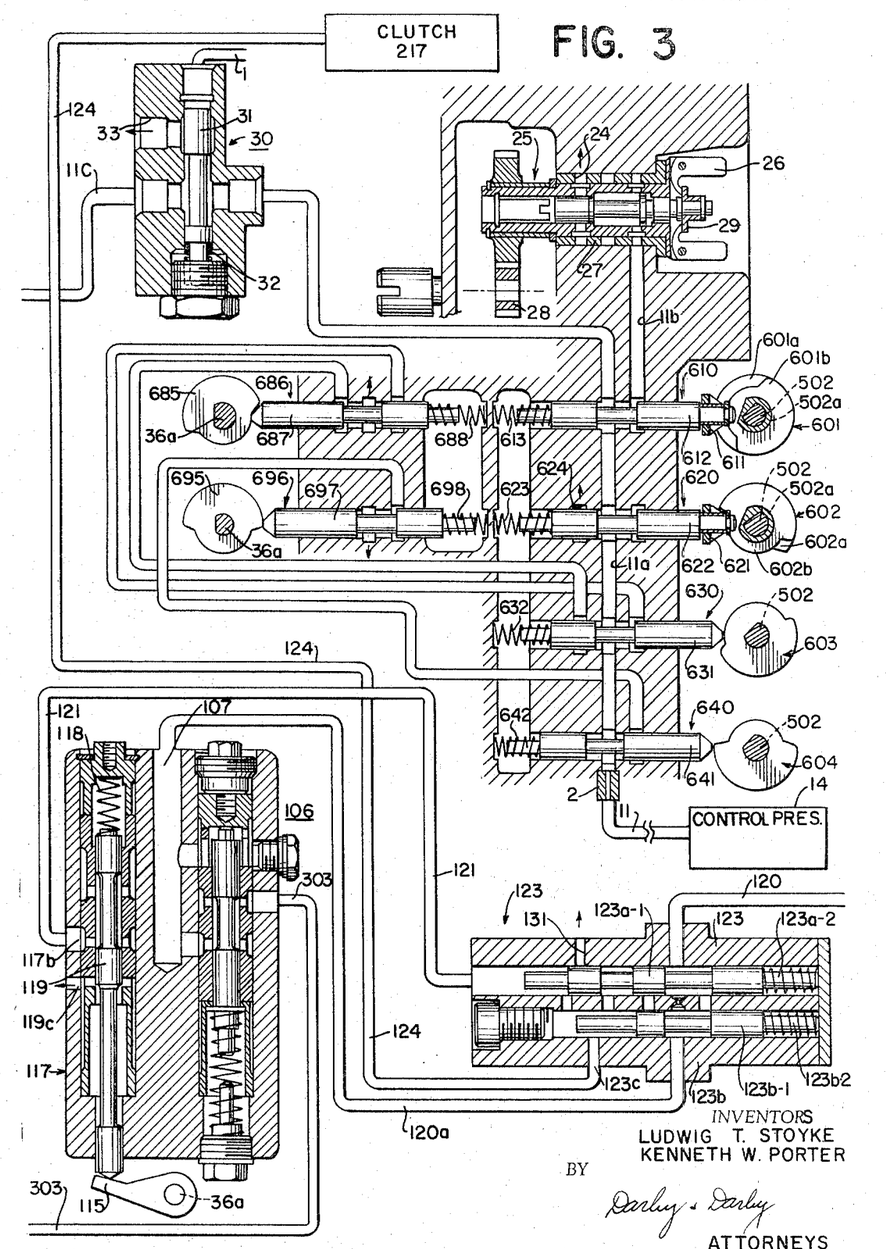
Figure 4:
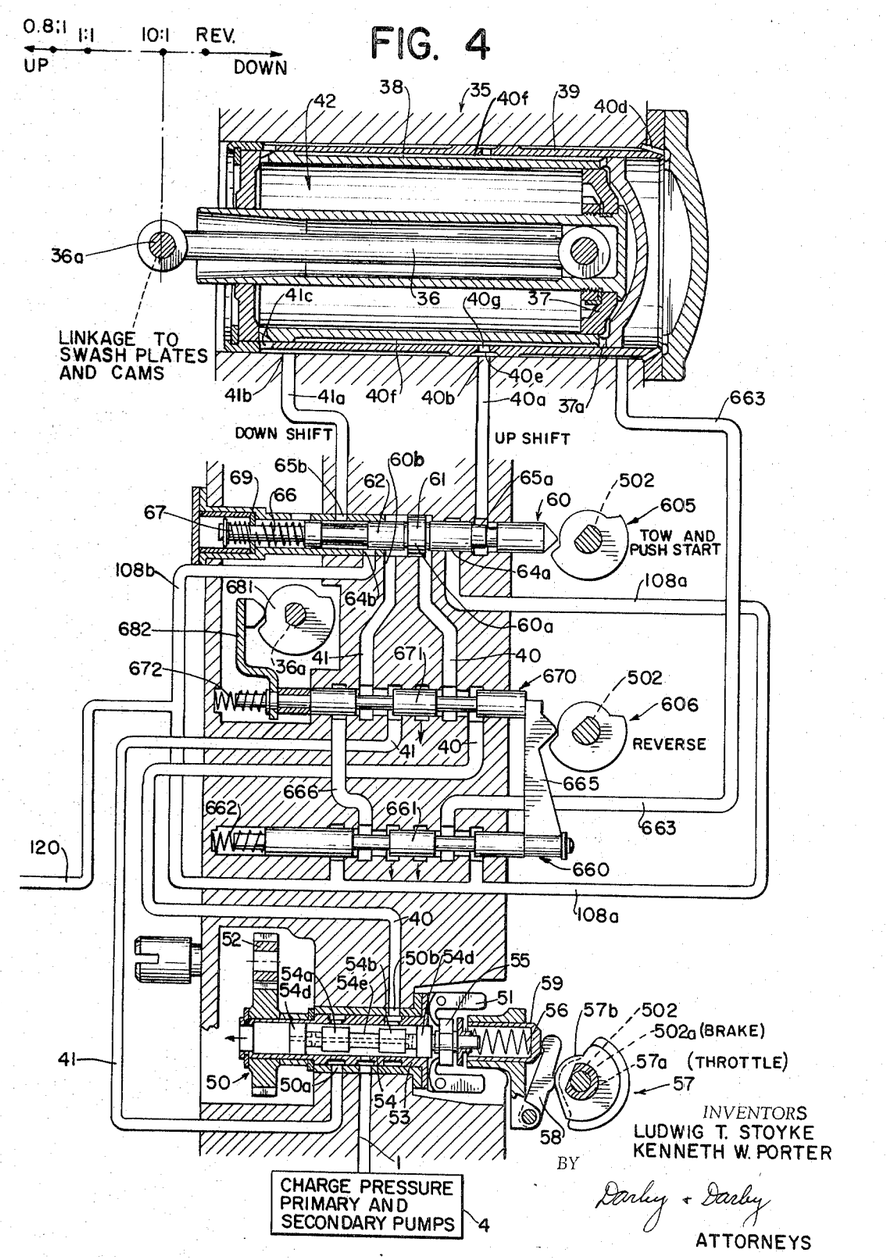

Referring to FIGURES 2–4, the high and low pressure ports between the pump and motor units are shown at 10 and 11 respectively. The hydrostatic pump and motor units are not shown in detail, these being conventional in the art. Each unit may comprise a plurality of pumps and a plurality of motors which are connected to the ports, or conduits, in the appropriate manner. However, in the example being considered in FIGURE 1, there is one pump and three motors. It should be understood that the high and low pressure ports, also called the fluid pressure and return ports or conduits interchange when the system is placed into reverse or in overdrive.

CHARGE PRESSURE

Charge pressure, which is the main source of operating pressure for the actuator control portion of the system, shown in FIG. 4, is supplied by line 1 from a source 4 of any suitable type to operate the system. The charge pressure is usually provided by means of an auxiliary pump (not shown) delivering fluid, such as oil, having the required temperature and viscosity characteristics of the actuator control system. The actuator control system operates on a charge pressure in the range from 175–250 p.s.i. and wherever a charge pressure line 1 is shown, this pressure is normally available. The pumps, regulators, coolers and sumps for the charge pressure are not shown since they are conventional in the art.

Two charge pumps are preferably provided with the transmission system, one (primary) being directly driven from the planetary carrier or input shaft and the other (secondary) driven from the ring gear which also drives the primary pump 212. The capacity of these charge pumps is such that at low ratio they are capable of starting the vehicle at low engine speed. At high ratio (approximately 1:1) as ring gear speed is reduced to zero speed, secondary charge pump speed is similarly reduced so that this secondary charge pump becomes stationary and does not impose a power loss to the system. Consequently, the transmission is only penalized by one charge pump creating variable delivery flow with a constant displacement pump.

CONTROL PRESSURE

Control pressure, which is lower than the charge pressure, is used to operate the valves for the mode selector portion of the control system, shown primarily in FIG. 3. The control pressure is produced by a source 14 (FIG. 3) which receives charge pressure as its input over a line 1. Source 14 preferably contains a regulating valve (not shown) which operates to supply control pressure after the charge pressure requirements and oil leakage factors of the transmission have been satisfied. Any suitable conventional arrangement may be used for accomplishing this.

ENGAGING VALVE

An engaging valve 15 is used to control the transfer of fluid from the pump unit to the motor units, or vice versa, between ports 10 and 11 in a manner such as to prevent jerky starts when a load is engaged by the vehicle. The spool 16 of the valve is loaded by a spring 17 which moves the spool to the right in the absence of a sufficient amount of control pressure. Control pressure is supplied from source 14, conduits 11 and 11a, an engagement sequence valve 30 and conduit 11c. When spool 16 is at its rightmost extremity against a stop 18 there is a free passageway for fluid transfer between ports 10 and 11, rather than between the pump and motor units, to prevent establishment of system pressure. This condition does not permit driving torque to be developed for the transmission output shaft and therefore vehicle movement is prevented. When the control pressure is conduit 11c is sufficient to overcome the bias of spring 17, this pressure called the engaging pressure, spool 16 is moved to the left permitting fluid transfer between the pump and motor units so that the transmission can engage and move the vehicle.

PRESSURE GOVERNOR

The pressure governor 25 receives the control pressure through control pressure conduit 11, orifice restrictor 2, conduit 11a and a branch conduit 11b. Restrictor 2 drops the higher control pressure down to a lower value as long as flow exists. Governor 25 has a number of flyweights 26 at one end which are pivotally mounted on the outer sleeve 27 of the governor and rotated by a suitable pick-off 28 driven by the vehicle prime mover (not shown) which may be any type of prime mover such as a gasoline, diesel, or gas turbine engine. The curved ends of the flyweights act against a bearing 29 connected to the shaft of a differential area spool of valve 25. Below a predetermined engine speed, say 700 r.p.m. for example, the centrifugal force produced by flyweights 26 acting axially on the differential area spool by the pivot arrangement and bearing 29 is less than the force caused by the control pressure from line 11b acting on the spool. In this condition the valve spool is moved to the left to permit oil flow to be vented to case pressure (neutral pressure point of the system which is shown by an arrowhead in each place it exists) through a port 24. The restrictor 2, vent port 24, differential spool area and weights of flyballs 26 are matched so that below the illustrative predetermined speed of 700 r.p.m. a greater load is exerted by the pressure than by the centrifugal force of the flyweights to keep vent port 24 open. Above 700 r.p.m. the centrifugal force of the flyweights moves the valve spool to the right and closes the vent 24 thereby permitting the entire control pressure to pass through an engagement sequence valve 30 to the end of the right hand land of spool 16 of engaging valve 15. The use of restrictor 2 prevents dumping of the entire control pressure to case.

Engaging valve 15 and pressure governor 25 operate together in the following manner. As the prime mover speed increases above the transmission engaging speed (700 r.p.m.), governor 25 closes vent port 24 to case pressure. As port 24 closes, the engaging pressure to engaging valve 15 gradually increases since less of the pressure is dumped to case through port 24. The engaging pressure from governor 25 increases to the extent, and the engaging valve 15 preloading spring 17 is so adjusted, so that at a desired speed (preferably 700 r.p.m. for example) the engaging valve 15 starts to close due to a pressure applied on the right end of spool 16 which is greater than the preload of spring 17. This causes the engaging valve to close the bypass between the high and low pressure ports 10 and 11.

Spool 16 of the engaging valve is of the differential area type and the spool reflects system pressure, or working pressure, since it communicates with both the high and low pressure ports 10 and 11. As vehicle load increases with the vehicle in forward drive, the system pressure in port 10 also increases and the spool is urged to the right to hold valve 15 partially open to bypass fluid between ports 10 and 11. Consequently, engaging valve 15 is influenced to remain open by system pressure and spring load. As system pressure increases, greater output pressure from governor 25 is required to close valve 15. This means that as the vehicle load increases, engaging valve 15 tends to remain open longer.

To summarize the operation of this feature, at normal vehicle load where system pressure is low, valve 15 is closed at 700 r.p.m. for example. When system pressure suddenly rises, say to 2000 p.s.i., the control pressure necessary for complete closure of valve 15 rises. This gives the effect of gradual engagement of the transmission because during the pick up of driving the wheels, some of the hydraulic oil is being bypassed by valve 15 to cushion the start effect. If this were not the case starting would be very abrupt and jerky.

The engaging valve 15 has a relief valve 19 at its right end. When spool 16 is moved rapidly to the right and an excess pressure is created in the right hand chamber of the valve 15, relief valve 19 opens to vent the chamber.

ENGAGEMENT SEQUENCE VALVE

The engagement sequence valve 30 is a safety feature to protect the transmission in the event charge pressure is lost. Spool 31 is biased by an adjustable spring 32 at its lower end and receives charge pressure at its upper end. If the charge pressure is in a safe operating range for the system, for example in excess of 100 p.s.i., spool 32 is moved against the bias of spring 32 to the position shown to permit engaging pressure from restrictor 2 to flow to engaging bypass valve 15 to close this valve. If the charge pressure drops below 100 p.s.i., spool 31 is moved by spring to open a vent 33 to dump the engaging pressure. This causes the engaging valve 15 to open to provide a free passageway between ports 10 and 11 so system pressure cannot be established to develop transmission output driving torque.

ACTUATOR

An actuator 35 (FIGURE 4) is provided which has a movable arm 36 to control the angular position of the swash plate or plates. Arm 36 is connected to a shaft 36a and the shaft is in turn connected to the swashplate linkage and swashplates for all of the cooperating motor or pump drums. The actuator includes a piston 37 to which arm 36 is connected, which is slidable within an inner cylinder 38. Cylinder 38 is enclosed within an outer housing 39. The pressure signals to move arm 36, and thereby tilt the swashplates to upshift or downshift the transmission, come from respective lines 40a and 41a. The pressure on upshift line 40a is applied to the actuator through port 40b between the outer wall of cylinder 38 and the inner wall of housing 39. Upshift pressure enters an annulus 40e through a port 40g annulus 40f, port 37a and is applied to the right side of piston head 37. The downshift pressure signal in line 41a enters the actuator through port 41b and goes into annulus 42 through port 41c and 41d at the left end of the actuator to act against the left side of the piston head 37. Therefore, an upshift signal moves arm 36 to the left and a downshift signal moves it to the right. Arm 36 connects to a suitable mechanical linkage (not shown) for moving the swashplates in the proper direction to vary the transmission ratio (e.g. from 10:1 to 1:1) in response to an upshift signal and to change it in the other direction in response to a downshift signal.

The actuator arm 36 is linked mechanically by a programmed camming arrangement, described below, to the elements controlling the hydraulic system, namely the swashplates of the pump and motors, and it represents in its travel a ratio integrator. Any one position within the stroke of arm 36 represents a transmission ratio. To maintain constant engine speed for a fixed fuel throttle position the actuator arm must be positioned to an actual displacement which will satisfy the load conditions acting on the vehicle in a manner which permits the prime mover output torque to drive the vehicle at a comparable speed. The actuator is shown in the 10:1 transmission ratio position. Movement of arm 36 and piston head 37 to the left upshifts the transmission so that a 1:1 ratio is obtained with head 37 near the left most position. The left most position of the head 37 places the motor swashplates at a negative angle and gives an overdrive ratio, for example of 0.8:1. Moving the piston head further to the right from the 10:1 ratio position shown causes the linkage 36a to place the swashplates of the pump at a negative angle and produces reverse action of the transmission. This action is described in detail below.

The pressure in lines 40a and 41a applied to actuator 35 through an amplifier valve 60 is higher than the charge pressure and is called the reducing pressure. The reducing pressure is, for example, in the order of 400 p.s.i. and is produced by a reducer valve 106 (FIGURE 3) connected to the system pressure through the shuttle valve 302 (FIG. 2). The system pressure is reduced through the restriction caused by the reducing valve spool. The regulated reducing pressure is directed through output port 107 of valve 106, line 120a, the two small orifices of a sequence valve 123, line 120, lines 108a and 108b to an amplifier valve 60 (FIG. 4) which controls the flow in lines 40a and 40b. Since, as is explained above, the upshift and downshift pressure signals on lines 40a and 41a are directed simultaneously to both the right and left sides of the piston head 37, the actuator at any one particular position of head 37 is continually modulated with pressure signals on both sides thereof to keep the actuator linkage in a position to satisfy the fuel throttle position. Changing the valve of the upshift signal with respect to the downshift signal, or vice versa, moves the actuator and the linkage to the swashplates of the pump and motor elements.

SPEED REGULATOR

Shifting of the actuator arm 36, to effect upshift or downshift of the transmission, is effected in a manner corresponding primarily to engine load (speed). The upshift and downshift signals in lines 40a and 41a to actuator 35 are produced by a speed regulator 50 (FIGURE 4) which controls amplifier valve 60, the latter controlling the upshift and downshift oil flow in lines 40a and 41a to the actuator. The speed regulator is described first.

A number of flyweights 51 are driven through a pickoff 52 geared to the prime mover and connected to an outer sleeve 53. The flyweights 51 are pivotally mounted on the end flange of sleeve 53 and the inertia force they develop is transmitted axially to valve spool 54 through the bearing 55 and spool shaft. The inertia force produced by the flyweights is counterbalanced by a variable rate spring 56 which acts against the right end of the spool shaft. The spring 56 has a variable rate selected to compensate for the square of the flyweight centrifugal force velocity component ($V^2$) to produce essentially linear governor action. Both ends of valve 50 are vented to case pressure.

As the prime mover speed increases, the flyweights assume a position more nearly vertical and their curved ends act against bearing 55 to move spool 54 to the right in opposition to the spring bias loading applied axially to the spool. The loading of spring 56 is set by a cam 57 against which rides a follower 58. Follower 58 abuts a housing 59 holding the spring so that as housing 59 is moved to the left by follower 58, the spring pressure increases making it more difficult for spool 54 to be moved to the right to produce a transmission upshift signal.

In the present system, cam 57 has two sections 57a and 57b. Section 57a is controlled by the throttle while section 57b is controlled by the drive mode selector. Increasing the throttle setting turns cam section 57a clockwise and increases the bias on spring 56 in the embodiment of the invention being described to retard upshifting of the transmission. The shape of section 57a is selected to provide a minimum fuel consumption for the engine in accordance with the throttle setting selected. The position of cam section 57a is controlled by selecting a particular fuel-throttle engine setting to obtain minimum fuel consumption. This is discussed in greater detail in Patent 3,139,723 to J. R. Hollowell, which is assigned to the same assignee. However, in the Hollowell patent a nonlinear governor is used whose $V^2$ effect is compensated in another manner. Cam section 57b is controlled by the drive mode selector to vary the bias on spring 56 during braking mode of operation in a manner described in detail below.

The speed regulator spool 54 is provided with one land 54a to cover the valve downshift output port 50a and another land 54b covering an upshift port 50b. Port 50c of the speed governor is supplied with charge pressure from source 4 and line 1. Ports 50a and 50b are never exposed to the charge pressure, the spool lands 54a and 54b being of sufficient, and equal, length to provide a pressure gradient from their respective charge pressure sides to the case side on both the downshift side as well as the upshift side. The lands 54a and 54b are spaced from the inner wall of the valve by guide lands 54d. The valve is vented to case pressure by a bore 54c through the spool 54.

When constant charge pressure is supplied to port 50c a gradient pressure is developed across lands 54a and 54b. At the equilibrium position of the control system, the spool 54 is centered and there is no pressure differential between the output signals at the upshift and downshift ports. As the speed of the prime mover changes from that producing the equilibrium condition, usually caused by a change in vehicle load or a desired change in speed, the flyweights and spring move the spool 54 either to the left or right to either increase or decrease the spool valving land position to cause resulting different up and downshift pressures at ports 50a and 50b. This pressure differential is directed to the differential area to spool 61 of the amplifier valve 60. Spool 61 is spring centered. A pressure differential displaces the spring center spool to allow oil flow to be directed from the reducing pressure lines 108a and 108b through lines 40a and 41a to either upshift or downshift the transmission ratio to satisfy the load requirements of the vehicle. In essence, the regulator 50 provides an upshift or downshift pressure differential signal proportional to the load of the vehicle (speed of the prime mover) so that the ratio of the transmission is shifted in a manner such to bring the prime mover speed to its best specific fuel consumption for the power demanded. As pointed out before, the rate of spring 56 and the design of ports 50a and 50b and valving spool lands 54a and 54b are such to make the upshift and downshift signals essentially proportional and linear to the prime mover speed.

AMPLIFIER VALVE

Amplifier valve 60 is the slave element for controlling the application of the reducing pressure in lines 40a and 41a connected to the actuator in response to upshift and downshift signals produced by regulator 50. The upshift and downshift pressure signals at the output ports 50a and 50b of regulator 50 are applied through a reverse interlock valve 670, whose function is described later, to input ports 60a and 60b located on opposite sides of a differential area land 61 on spool 62. Reducing pressure from reducing valve 106 is applied through a clutch sequence valve 123, line 120 and conduits 108a and 108b to input ports 64a and 64b adjacent the end sections of spool 62. The end sections of the spool control the output of the reducing pressure from corresponding ports 65a and 65b to the lines 40a and 41a connected to the actuator. As described previously, the oil flow and reducing pressure signals in these lines produce motion of the actuator shaft 36 and the swashplates.

The amplifier valve spool 62 is biased to the right by an upshift spring 66 and to the left by a downshift spring 67. The input signals at ports 60a and 60b must be sufficient to overcome the bias produced by each of these springs in order to produce upshift and downshift signals in lines 40a and 41a. Spring 66 acts against the upshift signal at port 60a while spring 67 acts against the downshift signal at port 60b.

The springs are located on the spool shaft and work against a collar 69 mounted within the valve. The sizes of the upshift and the downshift springs 66 and 67 are selected to be different due to the fact that the entire actuating system has a normal trend to upshift the transmission due to the actuating forces from the hydraulic elements applied to the swashplate linkage which tend to put the actuator to the forward position, that is, move it to the left. Therefore, the downshift spring is selected to be lighter than the upshift spring to balance the gain characteristics of the system, for example, 50 lbs./in. versus 400 lbs./in. Consequently, for a given output signal from the speed regulator 50 a greater displacement of the amplifier spool 62 is obtained downshifting with a correspondingly greater port 65b opening to create a more rapid response of the actuator toward the downshift position. On the other hand, in the upshift position with the high rate spring a very small port 65a opening is obtained from the amplifier thereby restricting the oil flow to the actuator in the upshift. This is basically the servo system applicable in forward drive regardless of the speed regulator biasing. The upshift signal applied to amplifier valve 60 is essentially a differential pressure output from the speed regulator 50 which is proportional to prime mover speed. This differential pressure during upshift mode is primarily an upshift signal which is applied to a differential area spool 62 of the amplifier valve. Spool 62 is shifted in proportion to prime mover speed due to the linear operation of regulator 50. Therefore, for a given prime mover input speed, proportional porting of amplifier valve output ports 65 and 65b is obtained. The opening of these ports change linearly in direct proportion to the input speed after the input signal overcomes the initial bias of springs 66 and 67.

The system is essentially a flow control system to position the actuator 35 at any one particular ratio so that the engine is never lugged below the fuel throttle position. A 200 r.p.m., approximately, hysteresis band is selected preferably so that the engine is lugged 200 r.p.m. before obtaining an output signal change from the speed regulator to be applied to the amplifier valve so that the porting is changed sufficiently to change the flow condition leading to the actuator. If an attempt is made to increase speed and accelerate the vehicle, the fuel throttle is depressed, bias is increased on the speed regulator spool and it is shifted so that the output is a downshift signal. For example the speed governor is provided with two valving lands that cover a downshift as well as an upshift port.

PRODUCTION OF REDUCING PRESSURE

The reducing pressure for lines 40a and 41a is produced from the system pressure in either of ports 10 or 11 (FIGURE 2). Ports 10 and 11 are connected by respective lines 300 and 301 to a shuttle valve 302, which is actually a double check valve. Whichever port 10 or 11 has the high system pressure, this pressure being higher than charge pressure, the pressure in its line opens the corresponding side of the shuttle valve 302 and prevents system pressure to flow over line 303 to the input port of the reducing valve 106. The output of reducing valve 106, which is the reducing pressure, is applied over line 120a to a sequence valve 123 and line 120 to the amplifier valve 60.

MISCELLANEOUS

A relief valve 310 is also connected to the system pressure line 303. Valve 310 receives the high side system pressure from either of ports 10 or 11 depending upon which portion of check valve 302 is open. If the system pressure exceeds a predetermined limit, which might damage the components of the control system or the transmission, then relief valve 310 opens. This applies pressure over line 311 to the left hand side of spool 16 of the engaging valve 15 causing valve 15 to remain open and bypass the ports 10 and 11.

To restore oil lost by the system, check valves 320 and 321 are respectively connected to lines 300 and 301 and the charge pressure line 1. When the charge pressure applied to valves 320 or 321 exceeds the system pressure from respective ports 10 and 11, the valve connected to the low pressure port opens and charge pressure is applied to that port to restore the lost oil. Two charge valves are needed since either port 10 or 11 may be the low pressure port.

MODE SELECTOR

Figure 5:
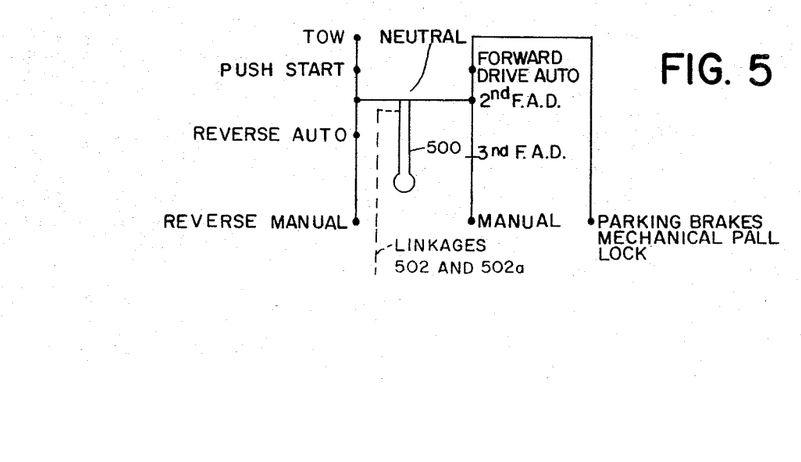
FIGURE 5 is a diagram of the mode selection pattern available with the transmission of the present invention.

FIGURE 5 shows the mode selector shift pattern produced by a mode selector lever 500. The shift lever 500 controls the movement of the various cams shown in FIGURES 2–4 by means of linkages 502 and 502a. The linkages are shown only schematically since the mechanical details thereof are not important. Mode selector lever 500 and linkage 502 controls the operation of four cams 601, 602, 603 and 604 of FIGURE 3 and two cams 605, 606 of FIGURE 4 and 670 of FIGURE 2 while mode selector 500 and linkage 502a control one section 57b of the speed regulator cam 57 of FIGURE 4 and cam sections 601a and 602a of FIGURE 3. The specific operation of the cams 601–606 and 57 is discussed in detail below.

SYSTEM OPERATION

The other components of the control system are described below in the description of the operation of the control system. This operation is considered for all of the positions of the mode selector pattern of FIGURE 5.

I. Neutral

When the mode selector lever 500 is in the NEUTRAL position, linkage 502a moves one section 602a of cam 602 (FIGURE 3), which has independently operating sections 602a and 602b as shown by the solid and hatched cross-sections of the shafts connecting to linkages 502 and 502a. Movement of section 602a engages a follower 621 on the shaft of spool 622 of a valve 620. This moves spool 622 to the left against the bias of a spring 623 and vents the control pressure from restrictor 2 to case pressure through a port 624. This keeps the control pressure out of engaging valve 15 so that spool 16 cannot be moved to the left thereby keeping the bypass between ports 10 and 11 open.

At the same time, linkage 502 moves the end of a spring loaded pin 670 of FIGURE 2 on the engaging valve into a hole 671. This prevents the shaft end of spool 16 from being moved to the left past the pin so that spool 16 cannot be moved to the left to close valve 15 and cause the transmission to engage. Therefore, placing the mode selector lever 500 in NEUTRAL, both removes the control pressure from valve 15 and locks spool 16 mechanically so that the oil flow is circulated between ports 10 and 11.

II. Automatic forward drive

The system is shown in FIGURES 2–4 in this condition of operation. Operation with a constant fuel throttle setting, above the bias level of spring 56, so that speed regulator 50 can act, is discussed first.

As indicated above, the mode shift selector lever 500 (FIGURE 5) controls the cams of the control system of FIGURES 2–4 and therefore the mode of operation of the control system. With lever 500 in the FORWARD DRIVE AUTO position, cams 601 through 606 are moved by linkage 502 to the positions shown. In particular, control pressure is now applied from restrictor 2 to governor 25 so that the engaging valve 15 is automatically operated in the manner previously described to control the engagement of the transmission.

With lever 500 in the FORWARD DRIVE AUTO position, operation of the control system is first discussed for the condition where the transmission shifts from the lowest ratio (10:1) to higher ratios.

As explained with respect to FIGURE 1 the transmission is provided with four hydraulic elements, three motors and a pump, hydraulically linked together to produce transmission ratio changes by means of actuator 35 controlling the swashplates. The mechanical linkage from actuator 35 to the swashplate is programmed by cam and cam tracks (not shown) proportioned in a predetermined manner to provide a change in pump and motor stroke as the actuator moves. At this point it is helpful to consider how transmission ratio changes are obtained. At start up the transmission is downshifted to its lowest ratio, for example 10:1 (hydraulic) as shown in FIGURES 2–4. At this position the cams are so designed so that the pump swashplate angle is at approximately 7½ degrees and the motor swashplate angles for all three motors are at 15 degrees. The third motor 213–3 is engaged through clutch 217 and a 3:1 gear 216 ratio step-down to the output shaft. In this configuration motors 213 are operated at full displacement to obtain, insofar as hydraulic torque multiplication is concerned, a total of four hydraulic torque units out of motors 213–1 and 213–2 and two hydraulic torque units out of motor 213–3. The latter is multiplied by the gear 216 ratio so that six torque units are obtained. In this case the hydraulic torque system multiplies the prime mover torque input ten times giving the ratio 10:1 of FIGURES 2–4. In addition, due to the double planetary gear train of FIGURE 1, one mechanical torque unit is also transmitted giving a grand total torque multiplication of 11:1.

The cams and followers for the swashplates of the pump and motors are designed to vary the strokes of the pumps and motors linearly. There is no complicated cam track required and the cam tracks are essentially straight line with entrance and exit position radius to provide a gradual entrance and exit for the cam followers. The transmission is upshifted due to a decrease in load or an increase in prime mover speed which displaces the governor 50 to direct an upshift signal to the amplifier valve in the manner previously described. The amplifier spool 61 is displaced to direct oil flow to the actuator 35 to upshift the transmission. The cams are programmed to permit the pump to initially increase its stroke from 7½ degrees at ratio position of 11:1 to 15 degrees as the actuator arm 36 moves to the left in FIGURE 4. During this period of the actuator displacement the cam followers driving the swashplates for motors 213–1, 213–2 and 213–3 are on a dwell portion of a corresponding cam so that there is no change in the displacement of the three motors.

When the pump swashplate angle is changed from 7½ degrees to 15 degrees as the transmission upshifts, meaning that the displacement of the pump is now equal to the displacement of motors 213, the hydraulic torque multiplication is changed from 10:1 (with mechanical torque 11:1) to a total of two torque units from motors 213–1 and 213–2 and one torque unit from motor 213–3, multiplied by the step down ratio gear 216. Therefore, the total hydraulic torque multiplication in this configuration is 5:1 (6:1 with mechanical torque).

At this point of 6:1 ratio (total) the cams are programmed so that further movement of actuator in the upshift direction does not change displacement of the pump and the pump swashplate cam follower rests on a dwell portion of its cam. The cam followers for the swashplates of motors 213–1 and 213–2 are also still on a dwell portion of their respective cams. Upshift of the actuator from the 5:1 ratio moves the swashplate angle for motor 213–3 gradually from 15 degrees to zero degrees as the transmission is upshifted. Since motor 213–3 supplies three units of torque to the output, decrease of its swashplate angle decreases this torque output. Consequently, in going from 15 degrees to zero degrees, the total hydraulic and mechanical torque output decreases from 6:1 to 3:1 (total).

As the swashplate for motor 213–3 approaches zero degrees, due to the actuator arm continuing to move to the left, a linkage connected to arm 36 actuates an interlock cam 115 at the bottom of a clutching valve 117 (FIGURE 3) causing the bias of a spring 118 to move the spool valve 119 downward to shut off the charge pressure supply and vent the piston chamber of the clutch 217 through a port 119c. A sequence valve 123 having two sections, a clutch sequence valve 123a and an actuator sequence valve 123b, is also provided. At ratios between 10:1 to 6:1 the cam 115 is in the up position and the pressure applied to the input port 117a of valve 117 passes through output port 117b to line 121 and to the left end of clutch sequence valve 123a. Here it passes through the left output port of 123a into the left chamber of actuator sequence valve section 123b and out port 123c over line 124 to clutch 217. Supplying pressure in line 124 engages the third motor 213–3 so that its output adds to the total torque multiplication via gear train 216.

When cam 115 is rotated downward, spring 118 in valve 117 pushes spool 119 down to shut off pressure flow to output port 117b and vents this pressure to case through port 119C. The left hand chamber of sequence valve 123a no longer receives pressure over line 124 and a spring 123a–2 moves spool 123a–1 to the left venting the left hand chamber of the lower valve 123b to case pressure through valve 123a and vent 131. This also vents line 124 to case and any oil trapped in line 124 or clutch 217, which is of any suitable conventional construction, is also dumped to case, thereby disengaging the clutch and motor 213–3.

With the third motor 213–3 disengaged from the output shaft and the swashplate angles at 15 degrees for the pump and motors 213–1 and 213–2, a ratio of 3:1 is produced by each motor 213–1 and 213–2 producing one unit of torque and the one mechanical unit.

In this condiiton of 3:1 ratio the pump cam follower rides on a dwell position. As the transmission is upshifted still further from the 3:1 ratio the cams operate to reduce the stroke of motors 213–1 and 213–2, by reducing their swashplate angles, while maintaining the pump on dwell position at 15 degrees. The actuator continues to move to the left in the upshift position and the motors 213–1 and 213–2 gradually reduce their stroke. This means that the torque mutliplication from the hydraulic system is gradually reduced until motors 213–1 and 213–2 finally approach zero stroke. At this time the pump can no longer deliver hydraulic oil to the motors because they can no longer accept oil, thereby providing a hydraulic lock. At zero motor stroke there is also zero pump speed. Under these conditions there is no hydraulic multiplication and the entire drive is mechanical at 1:1 ratio. Full prime mover torque is delivered mechanically in a highly efficient manner, the only inefficiencies being caused by the friction of the rotating members within the transmission.

If upshift is continued, the actuator linkage cam drives the swashplates of motors 213–1 and 213–2 to negative angles with the pump swashplate remaining at 15° angle dwell position. This has the effect of driving the motors as pumps. The motors 213–1 and 213–2 then deliver oil to the pump 212 and cause the ring gear of the planetary system, which normally drives the pump 212, to rotate in a direction opposite its normal rotation to increase the output speed. This provides overdrive. An overdrive ratio of 0.8:1 is achieved in the illustrative system being described.

In downshifting, caused by increased load or increase in prime mover speed, the reverse sequence of events occurs from the 1:1 ratio down to the lower ratios. Here the sequence valves 123a and 123b operate to engage the clutch for the third motor 213–3. As the vehicle load increases and the prime mover speed decreases, causing the speed regulator 50 to produce a downshift signal for the same throttle setting and thereby move actuator arm 26 to the right towards the lower ratio positions, the transmission goes in sequence from overdrive to direct drive (1:1) and gradually to 3:1 as the swashplates for motors 213–1 and 213–2 are moved. At the 3:1 ratio position the interlock cam 115 is rotated up to actuate the spool 119 of clutching valve 117 upwardly. This permits pressure to be directed to clutch 217 in the following manner. Pressure is directed from the clutching valve 117 to the left end of clutch sequence valve 123a over line 121. The spool 123a–1 of clutch sequence valve 123a is displaced to the right to overcome the load of spring 123a–2 by the application of pressure on the opposing end. This moves speel 123a–1 to permit pressure flow to be directed from the left end of valve 123a to the left chamber of the second spool 123b–1 as well.

The second spool 123b–1 does not restrict flow to the clutching valve 117. It also always maintains a free passageway between its left hand chamber and line 124 to the clutch 217 no matter what the position of spool 123b–2. The second sequence valve 123b performs as an actuator sequence valve. Spool 123b–1 of valve 123b is loaded by a spring 123b–2 to, for example, twice the load of spring 123a–2 for spool 123a–1 of valve 123a. Therefore as long as the third motor clutch is being filled with oil and the pressure in the clutching circuit is below a predetermined value, for example 100 p.s.i. which is the loading of spring 123b–2, the spool 123b–1 of actuator sequence valve 123b is displaced to the left. As the clutch fills with oil and the fluid passing through the left hand chamber of valve 123a to the left hand chamber of 123b builds up to a pressure greater than 100 p.s.i., spool 123b–1 is moved to the right to the position shown in FIGURE 3. With the clutching sequence valve spool 123a–1 displaced to the right and with the actuator sequence valve spool 123b–1 displaced to the left by spring 123b–2 the flow of reducing pressure to the actuator 35 is restricted through valve 123 to line 120. With the restricted flow the rate of ratio change is retarded so that the clutching sequences may be satisfied before motor 213–3 is positioned into a positive swashplate angle.

Once the clutch piston (not shown) is displaced so that the clutch is engaged, pressure in the left hand chamber of valve 123b builds up to at least charge pressure, which is greater than the loading of spring 123b–2, and the actuator sequence valve spool 123b–1 is moved to the right to allow a free unrestricted flow of reducing pressure to the actuator 35 to permit it its normal downshift rate to continue. In this manner a shock free coupling of the third motor is attained. In summary the clutch 217 is engaged first and the actuator movement is retarded to prevent rapid downshift. This causes the third motor to be positioned into a motoring stroke before the clutch chamber is completely filled.

When clutch 217 is fully engaged, with motor 213–3 at neutral, and with the transmission continuing to downshift, the cams cause a change of the swashplate angle of the third motor to gradually increase it from zero degrees to 15 degrees. With the swashplates of the pump at 15 degrees and the motors 213–1 and 213–2 at 15 degrees, third motor 213–3 at 15 degrees, a 6:1 total ratio is provided. The transmission can continue to downshift in the manner already described for upshift operation. With the pump and all motors at 15 degrees in a 6:1 ratio, as the actuator further downshifts the pump angle gradually changes its stroke from 15 to 7½ degrees increasing the system pressure for final torque multiplication of 11:1.

This completes the upshift and downshift operation at constant fuel throttle position. The transmission will upshift and downshift at all fuel throttle positions. Essentially this system maintains a constant engine speed by changing the output in accordance with variations in load.

III. Forward automatic—change of throttle setting

The next operating sequence to be considered is that of increasing or decreasing the throttle setting. Referring now to the speed regulator (FIGURE 4), cam 57 has two independently operated sections 57a and 57b. Section 57a is linked to the throttle while section 57b is linked to the mode selector lever 500 through linkage 502a. Cam sections 57a and 57b are proportioned so that the minium diameter of braking cam 57b is greater than the minimum diameter of the throttle cam 57 and the maximum diameter of the throttle cam 57a is greater than the maximum diameter of the braking cam 57b. As shown in FIGURE 4, there is always some bias applied to spring 56 of the regulator by cam section 57b to prevent the transmission from upshifting.

With the load the same, application of more fuel throttle instantaneously applies more bias to spring 56 of the governor before the governor can respond to the increased prime mover speed. This momentarily causes the transmission to downshift and unloads the prime mover to permit it to speed up. However, as governor 50 senses the speed increase of the prime mover, and the fuel throttle is kept at the new setting, the governor begins to produce an upshift signal. This causes the transmission to upshift thereby increasing vehicle speed to balance the new engine power setting. Since the fuel throttle is mechanically linked by cam section 57a to the governor 50, only one throttle setting satisfies the new engine power requirements. By selecting the appropriate ratio between fuel throttle setting and biasing of governor spring 56, such as by appropriately shaping cam section 57a, the best transmission ratio is established for this power setting to achieve minimum fuel consumption.

With the load the same and the fuel throttle setting decreased, cam section 57a is moved to provide less biasing of spring 56. This causes the transmission to momentarily upshift. This causes additional loading of the vehicle and tends to decrease prime mover speed. As the governor 50 senses this change in prime mover speed, spool 54 is positioned to produce a downshift signal. This adjusts the transmission ratio to a lower power level corresponding to the minimum fuel consumption requirement of the prime mover.

IV. Forward automatic—braking

Moving mode selector 500 to the FORWARD AUTO 2nd or FORWARD AUTO 3rd positions produces an automatic braking action. Cam section 57b is moved by linkage 502a to apply more bias to spring 56 in the AUTO 2nd position and still more bias in the AUTO 3rd position with the effect that the transmission can only upshift at higher prime mover input speeds. With the mode selector 500 in normal AUTO FORWARD drive position the speed regulator 50 is preferably adjusted so that an upshifting signal is obtained at a predetermined prime mover speed, 1200 to 1350 r.p.m. for example. The transmission continues to upshift as long as r.p.m. exceeds 1200 to 1350 to match the engine power to the vehicle load. With the mode selector in the AUTO 2nd or AUTO 3rd position more spring bias is applied with the result that the transmission can only upshift above 1200/1350 r.p.m., that is, remains in the downshift position as long as the prime moved speed is not increased above the equivalent governor bias setting speed. The AUTO 3rd mode requires a higher engine speed to produce an upshift signal than the AUTO 2nd mode.

To illustrate the use of the braking provided by the AUTO 2nd and AUTO 3rd modes, consider the situation where the driver anticipates load conditions, as for instance off the road operation entailing a variety of loads, requiring precise maneuvering of the vehicle instead of economy of engine operation. This is accomplished by preventing the transmission from upshifting, that is, increasing the biasing of the speed regulator which keeps engine speed below the bias setting to stay in low ratio. In this way the natural tendency of the transmission to upshift is thwarted, in anticipation of variations in terrain (load) and the automatic control feature is overcome. The same concept can be utilized in braking the vehicle while going down hill. As a hill is approached the natural tendency is to reduce throttle by taking foot off the gas, this however, does not cause an immediate drop in engine speed due to the vehicle's inertia. Engine speed reduces slowly. If speed does not drop because the decline is already encountered, the vehicle's mechanical (service) brake should be applied slightly to thereby reduce engine speed. As engine is slowed sufficiently the transmission will downshift.

In the event of a long decline, even though the transmission downshifts, the stored potential energy increases vehicle speed and the engine speed. As soon as engine speed exceeds the bias loading of the speed regulator, the transmission will upshift to reduce the braking effects. Consequently, the driver will again apply the service brakes, creating additional resistance, slowing down the engine to cause the transmission to downshift again. In this manner, the vehicle may be driven down a long hill without continuous application of the service brakes.

V. Automatic reverse

When mode selector lever 500 is placed in the AUTO REVERSE position, linkage 502 turns cam 606 (FIGURE 4) clockwise. This moves spools 661 and 671 of the respective reverse and reverse interlock valves 660 and 670 to the left against the bias of respective springs 662 and 672. The two spools 661 and 671 are connected by a common follower 665. Moving spool 661 to the left vents line 663, which was supplying reducing pressure from line 120 through valve 660 and over line 663 to the right hand end of actuator cylinder 38, to case pressure. At the same time spool 671 moves to the left and blocks the upshift and downshift signals from lines 40 and 41 from amplifier valve input ports 60a and 60b. The interlock valve spool 671 at the left-most position also vents the right side (upshift side) of valve 60 directly to case pressure. Valve spool 661, in its leftmost position, directs reducing pressure through valve 660 over line 666, through valve 670 and line 41 to the downshift side of spool 61 of amplifier valve 60 to displace it to the extreme right.

In this condition with spool 61 shifted to the extreme right, amplifier valve 60 directs reducing pressure through line 41a into the actuator against the left side of actuator piston head 37 while at the same time venting the upshift pressure to the right of piston head 37 and movable cylinder 38 to case pressures through ports 40c and 40d through lines 40a and 663 respectively. Since there is no pressure in line 663 against the right side of cylinder 38, the reducing pressure in line 41a moves actuator piston head 37 and the entire cylinder 38 to the extreme right of housing 39. In this position the actuator, actuator cams and cam followers change the pump swashplate angle from positive to negative while maintaining the swashplates of motors 213–1, 213–2 and 213–3 in a cam dwell position of 15 degrees.

With the mode selector lever 500 in AUTO REVERSE, a low gear ratio is produced. This ratio is slightly less than the low ratio in forward automatic drive. Due to the reverse rotation of the three motors 213 caused by the negative pump angle, the mechanical torque is subtracted from the output shaft at the same pump-motor displacement ratio. The pump negative swashplate angle can be changed from the full power rating 7½ degrees to slightly less than 7 degrees to get the same low ratio in reverse as in forward. The cam and follower for the pump swashplate are therefore designed to cause the pump to assume a negative angle of about 4 to 5 degrees.

It should be noted that there is no automatic ratio control of the transmission in reverse since the interlock reversing valve 670 shunts the speed regulator output signals. In REVERSE, the transmission remains in low ratio. With the transmission in REVERSE mode, two reverse interlock cams 681 (FIGURE 4) and 685 (FIGURE 3) are actuated by the actuator linkage 36a when cylinder 38 moves near its right-most limits. Cam 681 is turned clockwise so that its follower 682 holds spool 671 of reversing valve 670 to the left. Spool 671 cannot return to the right until the transmission is taken out of AUTO REVERSE MODE and the actuator has reached a predetermined point in its travel out of reverse mode, namely, when cylinder 38 moves to near its left-most position. Cam 685 is operated by the actuator arm 36 to position the valve spool 687 to the right only after reaching minimum reverse ratio. With valve 686 open engaging pressure is vented to case from valve 630 to prevent overloading of the transmission at extreme low ratios.

With the mode selector in reverse, cam 603 is turned clockwise to move spool 631 of valve 630 to the left against the bias of spring 632. This directs the control pressure out of the left hand output port of valve 630 into the left hand port of a valve 686 whose spool 687 is operated by cam 685. Either lands of the spool 687 of valve 686 can be vented to case pressure, as shown in FIGURE 3. When interlock cam 685 is actuated by the actuator arm 36 spool 687 is moved to the right against the bias of spring 688. This closes the left hand port and vents only the right hand port of valve 685 to case pressure. The operation of cam 685 and valve 686 is described below in detail.

Consider now the situation where mode selector 500 is first shifted from AUTO REVERSE to AUTO FORWARD. In doing this, cams 603 (FIGURE 3) and 606 (FIGURE 4) are returned to the positions shown. However, the spool of the interlock reverse valve 670 is held in the displaced position to the left by the interlock cam 681 for as long as the actuator is in the reverse position. When mode selector 500 is moved into forward position rotation of cam 606 causes the spool of reverse valve 660 to move toward the right. This directs reducing pressure over line 663 to the right hand end of the actuator chamber and it simultaneously permits the input port 60b of the downshift side of the amplifier valve, whose spool 61 is to the extreme right, to be vented to case pressure over line 41, through the interlock reverse valve 670, line 666 and through the reversing valve 660. This means equal pressure is exerted on the amplifier spool 61 because the input port 60a of the upshift side is vented to case pressure by spool 671 being in its left-most position and the downshift side input port 60b is vented by the displacement of the reversing valve spool to the right. Equal pressure on the differential area spool 61 of the amplifier valve positions the amplifier spool so that the downshift side is vented to case pressure and the upshift side is connected to reducing pressure over line 663. With pressure in the right hand end of actuator cylinder 38 from line 663, no pressure at the downshift side output of the amplifier valve 60, and pressure from line 40a between the piston head and the cylinder 38, the entire actuator assembly comprising the movable piston head 37, cylinder 38 and the actuator arm 36 is moved towards the left to a position where the cylinder 38 is bottomed against the left end cap of housing 39, as shown in FIGURE 4. In this position we have normal forward drive.

When the movable cylinder 38 approaches its final stop position at the left end of housing 39 the interlock cam 681 is rotated by the actuator linkage 36a enabling the interlock reversing valve 670 to be dropped off. As the interlock reversing valve 670 is dropped off, its spool 671 moves to the right to the position shown in FIGURE 4 to re-establish the normal forward automatic drive by allowing the speed regulator 50 output signal to be directed to the amplifier valve 60. This provides an unrestricted passageway to the amplifier valve 60 from speed regulator 50 and the interlock reversing valve 670 and the reverse valve 660 are no longer effectively in the system.

The operation of the interlock cam 685 (FIGURE 3) and cam 603 is now considered. When mode selector 500 is first moved to AUTO REVERSE from another drive position, such as AUTO FORWARD, cam 603 moves spool 631 of valve 630 to the left. During this time, and before linkage 36a has engaged interlock cam 685 to move spool 687 to the right, the left land of spool 687 is vented to case pressure. Moving spool 631 of valve 630 to the left vents the control pressure to case pressure through the left hand ports of valves 630 and 686. Therefore, the pressure governor cannot build up pressure to close the bypass provided by engaging valve 15.

When the actuator linkage 36a engages cam 685 to move spool 687 to the right, this occurring when actuator cylinder has moved to near its right-most reverse position, the vent from the left hand port of valve 686 to case pressure is closed. This permits control pressure to pass to governor 25 so that engaging pressure can be built up and applied to the spool of engaging valve 15. Thus the transmission cannot be loaded until the actuator is positioned to its minimum reverse ratio. The transmission will operate in reverse, providing engine speed is at least 700 r.p.m., in order to close the pressure governor 25. The pressure governor vents the engaging pressure until a speed of 700 r.p.m. is obtained. As previously mentioned, the engaging valve pressure is modulated with system pressure so that a variable closure of the engaging valve 15 is possible depending on system load.

When going from REVERSE AUTO to another drive mode such as FORWARD AUTO, the mode selector linkage first turns cam 603 to permit spool 631 of valve 630 to move to the right. Since spool 687 of valve 686 is also to the right, control pressure is vented to case pressure through the right hand output ports of valves 630 and 685. Therefore the engaging valve 15 is not closed and oil is recirculated between ports 10 and 11. Again, the interlock 686 prevents loading of the transmission during the transition from REVERSE to FORWARD mode. As the actuator linkage 36a starts to move to the right, cam 685 drops off and spool 687 moves to the left. This permits control pressure to be directed to the pressure governor 25 so that the transmission will engage at engine speeds above 700 r.p.m.

VI. Push start

To accomplish a push start mode selector 500 is placed in PUSH START. The output shaft or vehicle drive shaft is equipped with a charge pump (not shown). As the vehicle is pushed, charge pressure is developed to be utilized for controlling the actuation system. The speed regulator 50, normally driven from the transmission input shaft, is not rotated during a push start. Since the speed regulator signal generated due to the bias of spring 56 is essentially a downshift signal, spool 54 is displaced to the left permitting a downshift pressure signal to be applied to the amplifier spool 61. Since it is very difficult to start an engine in low ratio, the normal position of the servo system must be altered so that the transmission can be upshifted without the benefit of the speed regulator signal. Therefore, the amplifier spool is arranged to be displaced when the mode selector is moved to the PUSH START position so that an artificial upshift signal can be created to upshift the transmission. This is accomplished as follows.

Placing mode selector 500 in the PUSH START position causes linkage 502 to rotate cams 604 (FIGURE 3) and 605 (FIGURE 4). Rotation of cam 604 permits spool 641 of a valve 640 to move to the right under the bias of a spring 642. This vents engaging pressure from the right hand port of valve 640 to case pressure through the right hand port of a valve 696. The engaging valve 15 therefore cannot be closed to engage the prime mover.

Cam 605 (FIGURE 4) moves spool 61 of amplifier valve 60 to the left when the mode selector is in PUSH START, permitting an upshift signal to flow in line 41a and no downshift signal in line 40a. As the vehicle is pushed and gains speed the transmission upshifts to 3:1. At this point the actuator linkage 36a engages an interlock cam 695 (FIGURE 3) operating valve 696. Cam 695 moves spool 697 of valve 696 to the right against the bias of a spring 698. This closes the vent to case pressure so engaging pressure can be developed to close spool 16 of valve 15. As spool 16 closes the motors 213 acting as pumps supply oil to the primary pump 212 acting as a motor to rotate the input shaft and engine for the starting cycle. As vehicle speed increases, the transmission gradually upshifts to the 1:1 position. If the engine is not started, the push start is released to allow the vehicle to decrease speed as the transmission downshifts to normal start position. The cycle is thereby repeated until the prime mover fires for normal power drive.

VII. Tow

When the mode selector 500 is placed in the TOW position, it is desirable to maintain disengagement of the hydraulic components and to circulate a minimum amount of oil, maintain the engaging valve in the disengaged position and upshift the actuator 35 to achieve as high a gear ratio as possible.

In TOW position linkage 502 turns cam 605 (FIGURE 4) to move spool 61 to the left. This upshifts the actuator 35, as in the PUSH START mode, to achieve the high ratio needed for easy towing. Linkage 502 also turns section 602b of cam 602 (FIGURE 3) to vent the control pressure to case pressure through valve 620 as spool 622 is moved to the left. This prevents engaging valve 15 from operating during the time that the mode selector is in TOW position. The mechanical interlock 670 (FIGURE 2) for the engaging valve 15 is also utilized.

VIII. Manual forward and reverse

Moving selector lever 500 to "MANUAL FORWARD" or "MANUAL REVERSE" causes cam sections 601a and 601b of cam 601 (FIGURE 3) respectively to engage follower 611 and move spool 612 to the left. This shuts off control pressure flow to governor 25 and permits the control pressure to pass directly through sequence valve 30 to the engaging valve 15. Therefore, the transmission engages without the necessity of having the prime mover increase engaging speed (700 r.p.m.) of the governor 25. In manual mode the shift lever 500 also applies full braking bias to spring 56 so that the speed regulator can never produce an upshift signal.

While a preferred embodiment of the invention has been described above it will be understood that this embodiment is illustrative only and the invention is to be limited solely by the appended claims.

What is claimed is:
1. In a control system for an infinitely variable hydrostatic transmission of the type having pump and motor units with interconnecting fluid pressure and return conduits and an associated prime mover the combination comprising:
   a speed governor driven by the prime mover at a speed substantially proportional to the prime mover speed for producing output signals representative of the prime mover speed, said governor including:
      (a) a valve with output ports,
      (b) a spool positionable in response to the prime mover speed to vary the pressure output signal signals from the ports, and
      (c) means operating with said spool to produce a substantially linear relationship between the pressure output signals from the ports and the prime mover speed,
   actuator means having means for connection to the pump and motor units to vary the fluid displacement thereof and thereby change the ratio of the transmission,
   and amplifier valve means connected between said governor and said actuating means and responsive to the pressure signals at the governor output ports to change the ratio of the transmission.

2. A control system as set forth in claim 1 wherein the spool for the governor valve has a pair of lands which cover the valve output ports at all times whereby the pressure output signals at said ports are pressure gradients.

3. A control system as set forth in claim 2 wherein the means operating with the spool of the governor to produce the substantially linear output signal relationship is a variable rate spring biasing said spool.

4. In a control system for an infinitely variable hydrostatic transmission of the type having pump and motor units with interconnecting fluid pressure and return conduits and an associated prime mover the combination comprising:
   a speed governor driven by the prime mover at a speed substantially proportional to the prime mover speed for producing output signals representative of the prime mover speed, said governor including:
      (a) a valve with output ports,
      (b) a spool positionable in response to the prime mover speed to vary the pressure output signals from the ports, and
      (c) means operating with said spool to produce a substantially linear relationship between the pressure output signals from the ports and the prime mover speed,
   actuator means having means for connection to the pump and motor units to vary the fluid displacement thereof and thereby change the ratio of the transmission,
   and amplifier valve means connected between said governor and said actuating means and responsive to the pressure signals at the governor output ports to change the ratio of the transmission, said amplifier valve means including:
      (a) a spool positionable in response to the signals at the output ports of the governor valve to control the fluid pressure flow to the actuator means, and
      (b) means for controlling the movement of said spool such that it takes a larger signal at one of the output ports of the governor than at the other port to cause spool motion.

5. A control system as set forth in claim 4 wherein the movement controlling means for the spool of the amplifier valve includes a pair of springs of unequal rate located axially of said spool and in engagement therewith to control the axial movement of the spool.

6. In a control system for an infinitely variable hydrostatic transmission of the type having pump and motor units with interconnecting fluid pressure and return conduits and an associated prime mover the combination comprising:
  a speed governor driven by the prime mover at a speed substantially proportional to the prime mover speed for producing output signals representative of the prime mover speed, said governor including:
    (a) a valve with output ports,
    (b) a spool positionable in response to the prime mover speed to vary the pressure output signals from the ports, and
    (c) means operating with said spool to produce a substantially linear relationship between the pressure output signals from the ports and the prime mover speed,
  actuator means having means for connection to the pump and motor units to vary the fluid displacement thereof and thereby change the ratio of the transmission,
  amplifier valve means connected between said governor and said actuating means and responsive to the pressure signals at the governor output ports to change the ratio of the transmission,
  and means connected to said governor to control the production of the output pressure signals therefrom in response to the prime mover throttle setting in a manner such to retard shifting of the transmission ratio in the direction normally produced by increased prime mover speed.

7. In a control system for an infinitely variable hydrostatic transmission of the type having pump and motor units with interconnecting fluid pressure and return conduits and an associated prime mover the combination comprising:
  a speed governor driven by the prime mover at a speed substantially proportional to the prime mover speed for producing output signals representative of the prime mover speed, said governor including:
    (a) a valve with output ports,
    (b) a spool positionable in response to the prime mover speed to vary the pressure output signals from the ports, and
    (c) means operating with said spool to produce a substantially linear relationship between the pressure output signals from the ports and the prime mover speed,
  actuator means having means for connection to the pump and motor units to vary the fluid displacement thereof and thereby change the ratio of the transmission,
  amplifier valve means connected between said governor and said actuating means and responsive to the pressure signals at the governor output ports to change the ratio of the transmission,
  and selectively operable means connected to said governor to control the production of the output pressure signals therefrom in a manner such to retard upshifting of the transmission ratio when the prime mover is being driven.

8. In a control system for an infinitely variable hydrostatic transmission of the type having pump and motor units with interconnecting fluid pressure and return conduits and an associated prime mover the combination comprising:
  a speed governor driven by the prime mover at a speed substantially proportional to the prime mover speed for producing output signals representative of the prime mover speed, said governor including:
    (a) a valve with output ports, and
    (b) a spool positionable in response to the prime prime mover speed to vary the pressure output signals from the ports, and
  actuator means having means for connection to the pump and motor units to vary the fluid displacement thereof and thereby change the ratio of the transmission,
  amplifier valve means connected between said governor and said actuating means and responsive to the pressure signals at the governor output ports to change the ratio of the transmission by controlling said actuator means,
  an engaging valve having connections to said fluid pressure and return conduits for controlling the fluid flow in said conduits,
  mode selector means for selecting various operating modes of the control system,
  and mechanical interlock means operated by said mode selector means in at least one of the operating modes to place said engaging valve in a condition whereby the said conduits have a substantially unrestricted fluid flow therebetween.

9. In a control system for an infinitely variable hydrostatic transmission of the type having pump and motor units with interconnecting fluid pressure and return conduits and an associated prime mover the combination comprising:
  a speed governor driven by the prime mover at a speed substantially proportional to the prime mover speed for producing output signals representative of the prime mover speed, said governor including:
    (a) a valve with output ports, and
    (b) a spool positionable in response to the prime mover speed to vary the pressure output signals from the ports, and
  actuator means having means for connection to the pump and motor units to vary the fluid displacement thereof and thereby change the ratio of the transmission,
  amplifier valve means connected between said governor and said actuating means and responsive to the pressure signals at the governor output ports to change the ratio of the transmission by controlling said actuator means,
  an engaging valve having connections to said fluid pressure and return conduits for controlling the fluid flow in said conduits, said engaging valve including a spool and means for normally biasing said spool to a position whereby there is substantially unrestricted fluid flow between said two conduits,
  mode selector means for selecting various operating modes of the control system,
  and mechanical interlock means operated by said mode selector means in at least one of the operating modes to hold the spool in a position wherein there is substantially unrestricted fluid flow between the two conduits irrespective of any other operating condition of the system or prime mover.

10. In a control system for an infinitely variable hydrostatic transmission of the type having pump and motor units with interconnecting fluid pressure and return conduits and an associated prime mover the combination comprising:
  a speed governor driven by the prime mover at a speed substantially proportional to the prime mover speed for producing output signals representative of the prime mover speed, said governor including:
    (a) a valve with output ports, and
    (b) a spool positionable in response to the prime mover speed to vary the pressure output signals from the ports, and
  actuator means having means for connection to the pump and motor units to vary the fluid displacement thereof and thereby change the ratio of the transmission,
  amplifier valve means connected between said governor and said actuating means and responsive to the pressure signals at the governor output ports to change the ratio of the transmission by controlling said actuator means, an engaging valve having connections to said fluid pressure and return conduits for controlling the fluid flow in said conduits, said engaging valve including a spool and means for normally biasing said spool to a position whereby there is substantially unrestricted fluid flow between said two conduits, an engagement sequence valve operating from a source of charge pressure for permitting fluid at control pressure to flow to said engaging valve when the control system is operating in a normal driving mode whereby the spool of the engaging valve is moved to a position to restrict fluid flow between the two conduits so that the transmission can engage, and means connected to said engagement sequence valve and responsive to a charge pressure of below a certain value to block flow of control pressure to the engagement valve whereby the substantially unrestricted fluid flow is maintained between the two conduits.

11. A control system as set forth in claim 10 wherein the means of said engagement sequence valve for blocking the control pressure flow to the engagement valve includes a spool, and means for normally biasing said spool in a direction to vent the control pressure applied thereto, said spool being responsive to charge pressure above said certain value to keep the vent closed and permit control pressure fluid to flow to the engaging valve.

12. In a control system for an infinitely variable hydrostatic transmission of the type having pump and motor units with interconnecting fluid pressure and return conduits and an associated prime mover the combination comprising:

a speed governor driven by the prime mover at a speed substantially proportional to the prime mover speed for producing output signals representative of the prime mover speed, said governor including:
(a) a valve with output ports, and
(b) a spool positionable in response to the prime mover speed to vary the pressure output signals from the ports, and actuator means having means for connection to the pump and motor units to vary the fluid displacement thereof and thereby change the ratio of the transmission, amplifier valve means connected between said governor and said actuating means and responsive to the pressure signals at the governor output ports to change the ratio of the transmission by controlling said actuator means, an engaging valve having connections to said fluid pressure and return conduits for controlling the fluid flow in said conduits, said engaging valve including a spool for controlling the fluid flow between said conduits, and an overpressure relief valve operable in response to the system pressure having a fluid interconnection with said engagement valve, said relief valve including means responsive to system pressure above a predetermined value for directing fluid to said engagement valve to move its spool to a position where there is substantially unrestricted fluid flow between said conduits.

13. In a control system for an infinitely variable hydrostatic transmission of the type having pump and motor units with interconnecting fluid pressure and return conduits and an associated prime mover the combination comprising:

a speed governor driven by the prime mover at a speed substantially proportional to the prime mover speed for producing output signals representative of the prime mover speed, said governor including:
(a) a valve with output ports, and
(b) a spool positionable in response to the prime mover speed to vary the pressure output signals from the ports, and actuator means having means for connection to the pump and motor units to vary the fluid displacement thereof and thereby change the ratio of the transmission, amplifier valve means connected between said governor and said actuating means and responsive to the pressure signals at the governor output ports to change the ratio of the transmission by controlling said actuator means, an engaging valve having connections to said fluid pressure and return conduits for controlling the fluid flow in said conduits, said engaging valve including a spool for controlling the fluid flow between said conduits, an overpressure relief valve operable in response to the system pressure having a fluid interconnection with said engagement valve, said relief valve including means responsive to system pressure above a predetermined value for directing fluid to said engagement valve to move its spool to a position where there is substantially unrestricted fluid flow between said conduits, mode selector means for selecting various operating modes of the control system, and mechanical interlock means operated by said anode selector means in at least one of the operating modes to hold the spool in a position wherein there is substantially unrestricted fluid flow between the two conduits irrespective of any other operating condition of the system or prime mover.

14. In a control system for an infinitely variable hydrostatic transmission of the type having pump and motor units with interconnecting fluid pressure and return conduits and an associated prime mover the combination comprising:

actuator means having means for connection to the pump and motor units to vary the fluid displacement thereof and thereby change the ratio of the transmission, an engaging valve having connections to said fluid pressure and return conduits for controlling the fluid flow in said conduits, mode selector means for selecting various operating modes of the control system, means operated by said mode selector means in at least one of the operating modes for supplying a pressure signal to said engaging valve to place said engaging valve in a condition whereby the said conduits have a substantially unrestricted fluid flow therebetween, and mechanical interlock means also operated by said mode selector means in said one mode to hold said engaging valve in said condition for providing said unrestricted fluid flow.

15. In a control system for an infinitely variable hydrostatic transmission of the type having pump and motor units with interconnecting fluid pressure and return conduits and an associated prime mover the combination comprising:

actuator means having means for connection to the pump and motor units to vary the fluid displacement thereof and thereby change the ratio of the transmission, an engaging valve having connections to said fluid pressure and return conduits for controlling the fluid flow in said conduits, said engaging valve including a spool and means for normally biasing said spool to a position whereby there is substantially unrestricted fluid flow between said two conduits, mode selector means for selecting various operating modes of the control system, means operated by said mode selector means in at least one of the operating modes to hold the spool in a position wherein there is substantially unrestricted fluid flow between the two conduits irrespective of any any other operating condition of the system or prime mover, and mechanical interlock means also operated by said mode selector means in said one mode to hold said engaging valve in said condition for providing said unrestricted fluid flow.

16. In a control system for an infinitely variable hydrostatic transmission of the type having pump and motor units with interconnecting fluid pressure and return conduits and an associated prime mover the combination comprising:

actuator means having means for connection to the pump and motor units to vary the fluid displacement thereof and thereby change the ratio of the transmission, an engaging valve having connections to said fluid pressure and return conduits for controlling the fluid flow in said conduits, said engaging valve including a spool and means for normally biasing said spool to a position whereby there is substantially unrestricted fluid flow between said two conduits, an engagement sequence valve operating from a source of charge pressure for permitting fluid at control pressure to flow to said engaging valve when the control system is operating in a normal driving mode whereby the spool of the engaging valve is moved to a position to restrict fluid flow between the two conduits so that the transmission can engage, and means connected to said engagement sequence valve and responsive to a charge pressure of below a certain value to block flow of control pressure to the engagement valve whereby the substantially unrestricted fluid flow is maintained between the two conduits.

17. A control system as set forth in claim 16 wherein the means of said engagement sequence valve for blocking the control pressure flow to the engagement valve includes a spool, and means for normally biasing said spool in a direction to vent the control pressure applied thereto, said spool being responsive to charge pressure above said certain value to keep the vent closed and permit control pressure fluid to flow to the engaging valve.

18. In a control system for an infinitely variable hydrostatic transmission of the type having pump and motor units with interconnecting fluid pressure and return conduits and an associated prime mover the combination comprising:

actuator means having means for connection to the pump and motor units to vary the fluid displacement thereof and thereby change the ratio of the transmission, an engaging valve having connections to said fluid pressure and return conduits for controlling the fluid flow in said conduits, said engaging valve including a spool for controlling the fluid flow between said conduits, and an overpressure relief valve operable in response to the system pressure having a fluid interconnection with said engagement valve, said relief valve including means responsive to system pressure above a predetermined value for directing fluid to said engagement valve to move its spool to a position where there is substantially unrestricted fluid flow between said conduits.

19. In a control system for an infinitely variable hydrostatic transmission of the type having pump and motor units with interconnecting fluid pressure and return conduits and an associated prime mover the combination comprising:

actuator means having means for connection to the pump and motor units to vary the fluid displacement thereof and thereby change the ratio of the transmission, an engaging valve having connections to said fluid pressure and return conduits for controlling the fluid flow in said conduits, said engaging valve including a spool for controlling the fluid flow between said conduits, an overpressure relief valve operable in response to the system pressure having a fluid interconnection with said engagement valve, said relief valve including means responsive to system pressure above a predetermined value for directing fluid to said engagement valve to move its spool to a position where there is substantially unrestricted fluid flow between said conduits, mode selector means for selecting various operating modes of the control system, and mechanical interlock means operated by said mode selector means in at least one of the operating modes to hold the spool in a position wherein there is substantially unrestricted fluid flow between the two conduits irrespective of any other operating condition of the system or prime mover.

20. In a control system for an infinitely variable hydrostatic transmission of the type having pump and motor units with interconnecting fluid pressure and return conduits and an associated prime mover the combination comprising:

a speed governor means driven by the prime mover at a speed substantially proportional to the prime mover speed for producing a pair of output signals which vary substantailly linearly in a manner representative of the prime mover speed, actuator means having fluid connections to the pump and motor units for varying the fluid displacement thereof to change the transmission ratio, and means connected between said governor means and said actuator means and responsive to the pressure signals produced by the governor means to change the transmission ratio.

References Cited by the Examiner
UNITED STATES PATENTS

| | | | |
|---|---|---|---|
| 3,135,087 | 6/1964 | Ebert | 60—52 X |
| 3,139,723 | 7/1964 | Hollowell | 60—19 |
| 3,213,621 | 10/1965 | Swift et al. | 60—53 |

EDGAR W. GEOGHEGAN, *Primary Examiner.*